United States Patent
Kitai

[15] 3,691,923
[45] Sept. 19, 1972

[54] EXPOSURE TIME CHANGEOVER DEVICE FOR CAMERAS OR SHUTTERS

[72] Inventor: Kiyoshi Kitai, Tokyo, Japan

[73] Assignee: Kabushiki Kaisha Hattori Tokeiten, Tokyo, Japan

[22] Filed: Feb. 25, 1969

[21] Appl. No.: 802,101

[30] Foreign Application Priority Data

Feb. 28, 1968 Japan .....................43/12427

[52] U.S. Cl. ..............................................95/53 EB
[51] Int. Cl. ..............................................G03b 9/60
[58] Field of Search....................................95/53, 63

[56] References Cited

UNITED STATES PATENTS

| 3,452,662 | 7/1969 | Singer | 95/53 |
|---|---|---|---|
| 3,456,569 | 7/1969 | Noack | 95/53 X |
| 3,460,450 | 8/1969 | Ogihara | 95/53 X |
| 3,502,011 | 3/1970 | Rentschler et al. | 95/53 X |
| 3,507,201 | 4/1970 | Fahlenberg et al. | 95/53 |

Primary Examiner—Samuel S. Matthews
Assistant Examiner—Michael L. Gellner
Attorney—Robert E. Burns and Emmanuel J. Lobato

[57] ABSTRACT

A camera is provided with apparatus including an electric circuit, a battery for supplying electrical energy to the electric circuit, a changeover switch, and shutter operating means for operating the shutter. The shutter operating means is provided with a series of switch contacts electrically connected to the changeover switch and cooperative therewith to select one at least two exposure termination times, one shorter than the other, prior to the initiation of the exposure. The exposure termination time is controlled by an electro-magnetically controlled escapement mechanism.

6 Claims, 1 Drawing Figure

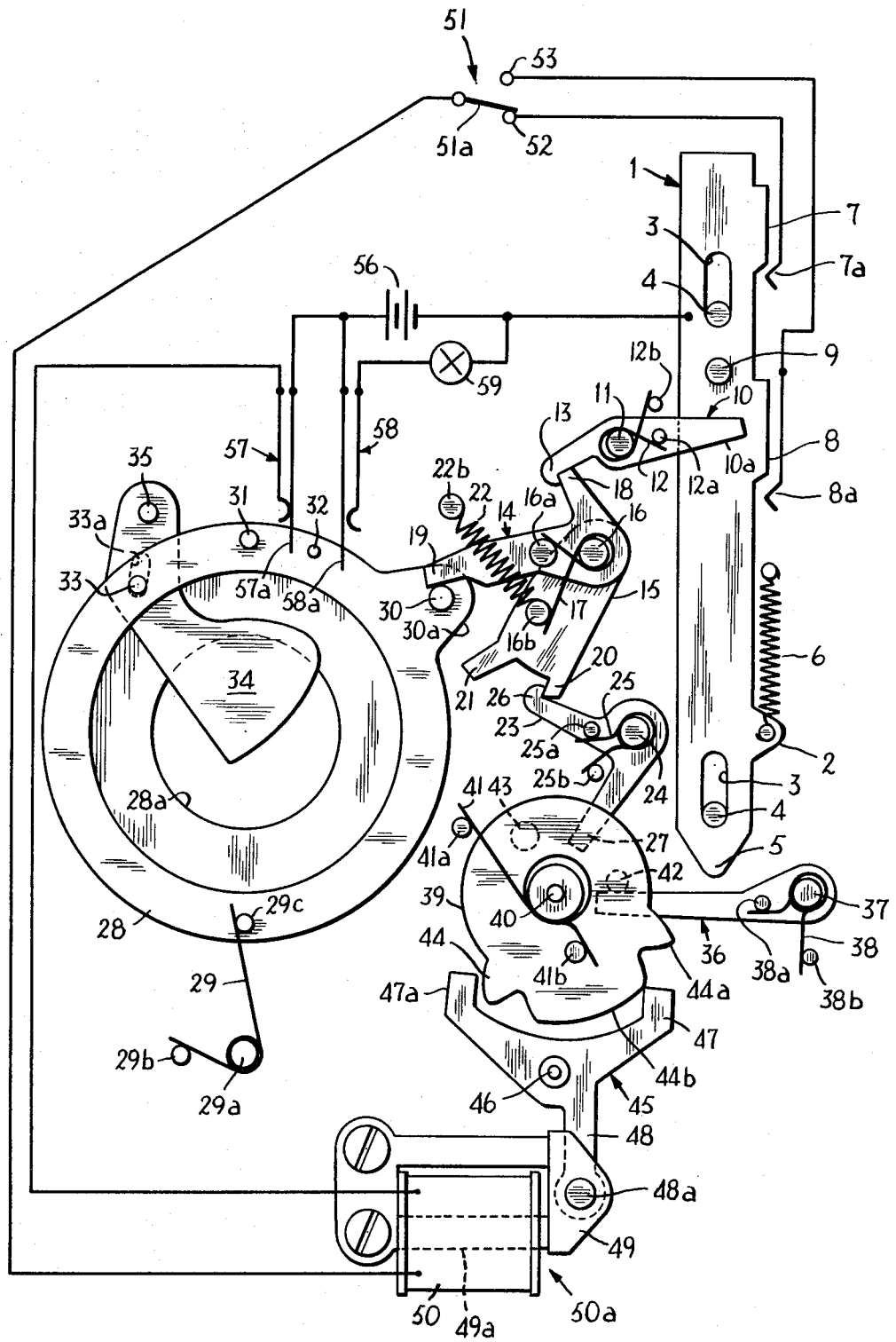

EXPOSURE TIME CHANGEOVER DEVICE FOR CAMERAS OR SHUTTERS

The present invention relates to a camera having apparatus including a two-position changeover switch that permits the operator to place the apparatus in a long or short time exposure mode.

It is an object of the present invention to provide apparatus for a camera that permits the operator to select a relatively long or relatively short exposure time.

It is another object of the present invention to provide in a camera a first and a second exposure termination time one shorter than the other.

It is still another object of the present invention to provide in a camera an improved apparatus for controlling the exposure timing of the shutter for the camera.

Having in mind the above and other objects that will be evident from an understanding of this disclosure, the invention comprises the devices, combinations and arrangements of parts as illustrated in the presently preferred embodiment of the invention which is hereinafter set forth in such detail as to enable those skilled in the art readily to understand the function, operation, construction and advantages of it when read in conjunction with the accompanying drawing which is a diagrammatic illustration of the apparatus of the present invention.

DESCRIPTION OF THE PREFERRED EMBODIMENT

In the drawing, there is shown an elongated manually operable trigger lever 1 formed in either end section with an elongated slot 3 which receives a respective one of a pair of fixed guide pins 4 which guide the trigger lever 1 in its endwise movement a predetermined distance dependent upon the length of the elongated slots 3. Integrally formed with and extending outwardly from the right side of the trigger lever 1 are a plurality of protrusions, including a tab 2 formed in the lower section of the lever 1, to which tab 2 there is secured one end of a coil spring 6 the other end of which is secured to a fixed pin, the spring 6 serving to bias the trigger lever 1 in an upward direction. Also integrally formed with and extending from the right side of the trigger lever 1 is a switch contacting or actuating surface 7 having a leading edge which is aligned with an electrical contact arm 7a, and a switch contacting or actuating surface 8 having a leading edge which is aligned with an electrical contact arm 8a. The switch contacting surface 7 and the corresponding electrical arm 7a provide for a long exposure time and the switch contacting surface 8 and the electrical contact arm 8a provide for a short exposure time and will be explained more fully below. The trigger lever 1 also includes a lower contacting end 5 and a lever actuating pin 9 that is mounted on one face of the lever 1 on the upper half thereof.

The actuating pin 9 is aligned with a pin contacting arm 10a of an elongated hook lever 10 and is pivotally mounted on a shaft 11. Wrapped about the shaft 11 is a spring 12 having an end in contact with a pin 12a mounted on the pin contacting arm 10a and another end in contact with a fixed pin 12b, so that the spring will bias the lever 10 in a counterclockwise direction as seen in the drawing. The elongated hook lever 10 includes a hook 13 which normally engages the locking arm 18 of a V-shaped lever 14 that is pivotally mounted on a shaft 16. Wrapped about the shaft 16 is a spring 17 having one end in contact with a pin 16a mounted on the lever 14 and another end that is in engagement with a pin 16b mounted on an elongated intermediate lever 15 intermediate the ends thereof, which lever 15 is also pivotally mounted by one end section on the shaft 16. The other arm of the V-shaped lever 14 is a pin contacting arm 19, while the other end of the elongated intermediate lever 15 is formed with a pair of spaced fingers, i.e., a locking finger 20 and a pin contacting finger 21. Secured by one end to the pin 16b on the lever 15 is a spring 22 the other end of which is connected to a fixed pin 22b which spring serves to bias the lever 15 in a clockwise direction. The spring 17 wrapped around the shaft 16 tends to bias the lever 14 and the lever 15 to pivot said levers to move the arm 19 of the lever 14 toward the finger 21 of the lever 15 to effect a scissors-like motion between the two levers. The finger 20 is normally engaged with the hook 26 of a substantially V-shaped hook lever 23 that includes a pin contacting arm 27 and is pivotally mounted on a shaft 24 substantially at the juncture of the two arms of the lever. Wrapped about the shaft 24 is a spring 25 having one end in engagement with a pin 25a mounted on the lever 23 and another end in contact with a fixed pin 25b, the spring 25 tending to bias the lever 23 in a clockwise direction as seen in the drawing.

Directly beneath the lever 23 there is shown a substantially disc-shaped cam plate 39 that is pivotally mounted on a shaft 40 about which is wrapped a spring 41 having an end that engages a fixed pin 41 and another end that engages a pin 41b mounted on one face of the cam plate 39, the spring 41 being arranged to bias the cam plate in a clockwise direction. On the other face of the cam plate 39 there is mounted a pair of spaced lever contacting pins 42 and 43. The lever contacting pin 42 is normally engaged with the end section of the arm of an elongated locking lever 36 that is pivotally mounted by its other end on a shaft 37 about which is wrapped spring 38 having one end in contact with a pin 38a mounted on the lever 36, and another end in contact with a fixed pin 38b, the spring 38 being arranged to bias the lever in a clockwise direction about the shaft 37 normally to bring the arm of the lever 36 into engagement with the pin 42. The cam plate 39 is formed with a pair of spaced ears 44 and 44a on the periphery of the cam plate 39, the ears being divided by a tail section 44b that also extends radially of the periphery of the disc-shaped cam plate 39. As shown in the drawing, the tail section 44b and the ear 44 are normally captured between the arms 47 and 47a of a substantially Y-shaped pawl 45 that is pivotally mounted at the juncture of its arms on a shaft 46. The Y-shaped pawl 45 also includes a supporting arm 48 that is pivotally mounted by its free end to a shaft 48a that in turn is mounted on an iron piece 49 to which is secured an iron core 49a that is received by the coil 50 of the electromagnet 50a. The substantially Y-shaped pawl 45 and the cam plate 39 cooperate to form a type of escapement mechanism the function and operation of which will be described more fully below.

The pin contacting arm 19 of the substantially V-shaped lever 14 is in alignment with a pin 30 that is mounted on a tab 30a extending outwardly of the periphery of a ring 28 that is mounted to rotate about a disc-shaped aperture 28a which functions as the optical axis of the camera. The ring 28 is biased in a counterclockwise direction by a spring 29 that is wrapped about a fixed pin 29a and includes an end that engages a fixed pin 29b, the other end of which engages a pin 29c mounted on the ring 28. Also mounted on the periphery of the ring 28 are a pair of spaced switch contacting pins 31 and 32, and a sector blade actuating pin 33. The pin 33 is received by an elongated slot 33a formed in the sector blade 34 which sector blade is pivotally mounted by one end section on a shaft 35. It is here noted that the sector blade 34 is only one of a plurality of such blades which comprise the shutter that is conventionally used in a camera to open and close the exposure aperture which in this drawing is indicated by the numeral 28a to expose a film strip mounted in the camera body in alignment with the aperture 28a.

A long exposure time contact 52 of a changeover switch 51 for selecting the exposure time is electrically connected to the electrical connecting arm 7a, the switch 51 also including a short exposure time contact 53 that is electrically connected with the electrical arm 8a. The switch 51 includes an arm 51a that is movable between the contacts 52 and 53, the contact arm 51a being electrically connected to one side of the electromagnet 50a the other side of which is electrically connected to a normally closed timing switch 57. The timing switch 57 includes a contact arm 57a which is electrically connected to the positive side of a self-contained electrical energy source or battery 56 the negative side of which is electrically connected to the trigger lever 1. The contact arm 57a is also electrically connected to the contact arm 58a of a synchronizer switch 58 that is connected to one side of a flash bulb 59 the other side of which is connected to the negative side of the battery 56. The leading edge of the switch contacting surface 7 is spaced only a slight distance from the contact arm 7a while the distance between the leading edge of the contact surface 8 and the contact arm 8a is greater than the distance between the surface 7 and the contact arm 7a and is equal to the distance between the lower contacting end 5 of the trigger lever 1 and the arm of the elongated locking lever 36 in the position of the elements as shown in the drawing.

Turning now to a description of the operation of the above described elements and the electrical circuitry, when a long exposure time is desired the manually operated changeover switch 51 is actuated to place the contact arm 51a into engagement with the long exposure time contact 52. Next the operator presses the trigger lever 1 to move the actuating surface downwardly to bring the leading edge thereof into contact with the electrical contact arm 7a thereby completing the circuit for the electromagnet coil 50, the timing switch 57, which at this point is closed, and the positive side of the battery 56, the negative side already being in electrical contact with the lever 1. The electromagnet 50a is thereby energized to hold the Y-shaped pawl 45 in the position shown in the drawing with the tail section 44b and the ear 44 captured between the arms 47 and 47a. Thereafter, even though the trigger lever 1 is pushed down so that the lower end 5 is brought into contact with the lever 36 to pivot the lever 36 downwardly thereby freeing the arm of the lever from engagement with the pin 42 on the cam plate 39, the cam plate 39 will not rotate in a clockwise direction because the cam plate 39 is held by engagement of the ear 44 with the arm 47a of the pawl 45. Thereafter, the trigger lever 1 is pushed down further until the pin 9 comes into contact with the arm 10a of the lever 10 thereby to rotate the lever 10 in a clockwise direction and free the arm 18 of the lever 14 from engagement with the hook 13. The lever 14 is then free to rotate in a counterclockwise direction about the shaft 16 under the urging of the spring 17. As the lever 14 rotates in a counterclockwise direction the arm 19 thereof engages and pushes the pin 30 downwardly thereby to rotate the ring 28 in a clockwise direction to move the sector blade 34 to its open position. As the ring 28 rotates in a clockwise direction, the pin 31 is brought into engagement with the contact arm 57a thereby to open the timing switch 57 and deenergize the electromagnet 50a. At this point, the pawl 45 is free to pivot about the shaft 46 and the cam plate 39 is free to rotate in a clockwise direction bringing the ear 44 past the arm 47a of the pawl 45. As the cam plate 39 rotates in a clockwise direction, the pin 43 is brought into engagement with the arm 27 of the substantially V-shaped hook lever 23 thereby to rotate the lever 23 in a counterclockwise direction and free the hook 26 from engagement with the locking finger 20 of the elongated intermediate lever 15. When this happens the lever 15 is free to rotate in a clockwise direction under the urging of the spring 22 to bring the pin contacting finger 21 into engagement with the pin 30 on the ring 28 thereby to rotate the ring 28 counterclockwise back to its original position. As the ring 28 is moved back to its original position, the shutter blade 34 is closed thereby completing the exposure of the film strip.

When a short exposure time is desired the switch 51 is actuated to bring the arm 51a into engagement with the contact 53. Then the trigger lever 1 is depressed by the operator bringing the leading edge of the actuating surface 7 into engagement with the contact arm 7a, however, since the arm 51a no longer engages the contact 52 the electromagnet will not be energized at this point. With the electromagnet deenergized the pawl 45 is free to pivot about the pin 46 and the cam plate 39 will not be hindered in its clockwise movement by the arm 47a of the pawl 45. As the lower contacting end 5 of the trigger lever engages the arm of the lever 36 the lever will be pushed downwardly or in a counterclockwise direction thereby freeing the cam plate 39 for clockwise movement about the shaft 40. As stated above, the electromagnet, at this point, is deenergized and the arm 47a will not block the movement of the cam plate 39. As soon as the cam plate 39 has rotated a distance equivalent to the width of the ear 44 the leading edge of the contacting surface 8 engages the contact arm of 8a. When the leading edge of the actuating surface 8 engages the contact arm 8a the circuit for the electromagnet 50a is closed through the switch 57, the battery 56 and the trigger lever 1. At this point, the electromagnetic coil 50 becomes energized thereby holding the Y-shaped pawl 45 in a fixed position once again to prevent further clockwise movement of the cam plate 39. As the trigger lever 1 moves downwardly, the pin 9 comes into engagement with the arm 10a of the lever 10 thereby rotating the lever 10 about the shaft 11 in a clockwise direction freeing the arm 18 of the V-shaped lever 14 from engagement with the hook 13 of the lever 10. With the lever 14 now free to rotate in a counterclockwise direction, the arm 19 which engages the pin 30 will move that pin downwardly thereby rotating the ring 28 in a clockwise direction. The sector blade 34 is moved to its open position and the pin 31 ultimately is brought into engagement with the contact arm 57a of the switch 57 thereby opening that switch and deenergizing the electromagnetic coil 50. With the electromagnetic coil 50 once again deenergized, the Y-shaped pawl 45 is free to pivot about the shaft 46 thereby freeing the cam plate 39 for rotary movement about the shaft 40. Once again, the pin 43 will be brought into engagement with the arm 27 of the substantially V-shaped hook lever 23 thereby moving that lever in a counterclockwise direction freeing the finger 20 from engagement with the hook 26. With the finger 20 free of engagement with the hook 26 the elongated intermediate lever 15 will pivot in a clockwise direction under the uring of the spring 27 to bring the pin contacting finger 21 into engagement with the pin 30 thereby to rotate the ring 28 in a counterclockwise direction. As the ring 28 rotates in a counterclockwise direction the sector blade 34 will be returned to its closed position thereby terminating the exposure of the film. As the ring 28 is rotated in a counterclockwise direction the substantially V-shaped lever 14 is pivoted in a clockwise direction by the pin 30 until the arm 18 is once more brought into engagement with the hook 13 of the elongated hook lever 10. It is noted that when the switch 51 is in the short exposure time position the cam plate 39 starts its final clockwise movement, which ultimately initiates the closing of the sector blade 34 from its open position, from a position that is advanced by the width of the ear 44. Since the cam plate 39 starts its final movement from an advanced position, relatively to the long exposure time mode as described above, the sector blade can begin its closing motion sooner than the aforementioned long exposure mode.

When the trigger lever 1 is released the spring 6 will bring the lever back to its original position thereby freeing the lever 36 for rotation about the shaft 37 in a clockwise direction under the urging of the spring 38. As the lever 36 rotates in a clockwise direction back to its original position, it will engage the pin 42 of the cam plate 39 to rotate the cam plate 39 in a counterclockwise direction to bring that cam plate back to its original position as shown in the drawing. In addition, the other levers are brought back to their original position under the urging of the respective springs to place the apparatus shown back in the original position ready for initiating a new series when the operator depresses the trigger lever 1.

What I claim and desire to secure by Letters Patent is:

1. In combination with a camera having a shutter, apparatus for opening and closing the shutter for an exposure comprising: manually operable actuating means for initiating the operation of the shutter; switch means for varying the exposure termination of the shutter and having a first mode of operation for initiating a first exposure termination time and having a second mode of operation for initiating a second exposure termination time longer than said first termination time; and means cooperating with said manually operable actuating means and said switch means for moving said shutter from a first, closed position to a second, open position and back to said first position, said last-mentioned means including an electromagnet electrically connected to said switch means, escapement means controlled by said electromagnet, and mechanical means selectively engaged by both said escapement means and said manually operable actuating means for effecting movement of said shutter.

2. A camera shutter combination as set forth in claim 1 wherein said manually operable actuating means includes an endwise movable elongated trigger lever having switch contacting surfaces and wherein said switch means includes electrical contact arms engageable with respective ones of said switch contacting surfaces when said trigger lever is manually operated to move the trigger lever endwise.

3. A camera shutter combination as set forth in claim 2 including a rotatable ring connected to said shutter and means connecting said mechanical means to said rotatable ring to rotate said ring to open and close said shutter.

4. A camera shutter combination as set forth in claim 1 wherein said escapement mechanism has a first starting position corresponding to the first switch mode to provide a first exposure termination time and a second starting position corresponding to the second switch mode to provide a second exposure termination time longer than said first exposure termination time.

5. In combination with a camera having a shutter; mechanical means for mechanically effecting opening and closing of the shutter to effect an exposure; manually operable actuating means coacting with said mechanical means for initiating the operation of the shutter; and cooperating means cooperating with said actuating means for providing at least two exposure termination times one shorter than the other comprising an escapement mechanism cooperative with said mechanical means to alternatively effect closing of the shutter at either of said two exposure termination times, electromagnetic means for controlling the operation of said escapement mechanism, and means including switch means electrically connected to said electromagnetic means for selectively effecting energization of said electromagnetic means to select one of said two exposure times prior to initiation of the exposure.

6. A camera shutter combination as set forth in claim 5 wherein said manually operable actuating means includes an endwise movable lever having a plurality of switch contacting surfaces and including a plurality of electrical contact means electrically connected to said switch means and selectively engageable with respective ones of said switch contacting surfaces.

* * * * *